(12) United States Patent
Brennan et al.

(10) Patent No.: US 10,669,444 B2
(45) Date of Patent: Jun. 2, 2020

(54) COATING FORMULATION WITH AN OPEN TIME ADDITIVE

(71) Applicants: Dow Global Technologies LLC, Midland, MI (US); Rohm and Haas Company, Collegeville, PA (US)

(72) Inventors: David J. Brennan, Midland, MI (US); Gregoire Cardoen, Blue Bell, PA (US); Jonathan DeRocher, Coopersburg, PA (US); Antony K. Van Dyk, Blue Bell, PA (US); Kimy Yeung, Phoenixville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 4 days.

(21) Appl. No.: 16/078,866

(22) PCT Filed: Mar. 6, 2017

(86) PCT No.: PCT/US2017/020854
§ 371 (c)(1),
(2) Date: Aug. 22, 2018

(87) PCT Pub. No.: WO2017/155845
PCT Pub. Date: Sep. 14, 2017

(65) Prior Publication Data
US 2019/0055422 A1    Feb. 21, 2019

Related U.S. Application Data

(60) Provisional application No. 62/306,964, filed on Mar. 11, 2016.

(51) Int. Cl.
| | | |
|---|---|---|
| *C09D 121/02* | (2006.01) | |
| *C08B 31/14* | (2006.01) | |
| *C09D 103/02* | (2006.01) | |
| *C09D 103/08* | (2006.01) | |
| *C08G 65/22* | (2006.01) | |
| *C08G 65/26* | (2006.01) | |
| *C08B 30/18* | (2006.01) | |
| *C09D 7/65* | (2018.01) | |

(52) U.S. Cl.
CPC ............ *C09D 121/02* (2013.01); *C08B 30/18* (2013.01); *C08B 31/14* (2013.01); *C08G 65/22* (2013.01); *C08G 65/2606* (2013.01); *C09D 7/65* (2018.01); *C09D 103/02* (2013.01); *C09D 103/08* (2013.01)

(58) Field of Classification Search
None
See application file for complete search history.

(56) References Cited

U.S. PATENT DOCUMENTS

| | | |
|---|---|---|
| 4,762,857 A | 8/1988 | Bollin, Jr. et al. |
| 4,831,128 A | 5/1989 | Tsai et al. |
| 4,839,164 A | 6/1989 | Smith |
| 5,026,566 A | 6/1991 | Roser |
| 5,340,394 A | 8/1994 | Elsamanoudi |
| 5,463,101 A | 10/1995 | Reierson |
| 5,543,513 A | 8/1996 | Mandai et al. |
| 6,372,902 B1 | 4/2002 | Partain, III et al. |
| 6,476,121 B1 | 11/2002 | Kadambande et al. |
| 6,762,230 B2 | 7/2004 | Brandenburger et al. |
| 6,946,426 B2 | 9/2005 | Martin et al. |
| 7,238,645 B1 | 7/2007 | Chow et al. |
| 7,381,796 B2 | 6/2008 | Roser |
| 7,705,082 B2 | 4/2010 | Porzio et al. |
| 8,231,925 B2 | 7/2012 | Ganesan et al. |
| 8,444,758 B2 | 5/2013 | Stockl et al. |
| 8,822,580 B2 | 9/2014 | Korenkiewicz et al. |
| 2007/0155880 A1 | 7/2007 | Bobsein et al. |
| 2008/0103237 A1 | 5/2008 | Strepka et al. |
| 2009/0076202 A1 | 3/2009 | Seibold et al. |
| 2009/0186972 A1 | 7/2009 | Zong et al. |
| 2010/0280162 A1 | 11/2010 | Stesikova et al. |
| 2014/0205530 A1 | 7/2014 | Guillot et al. |
| 2014/0256852 A1 | 9/2014 | Vandezande et al. |
| 2015/0073080 A1 | 3/2015 | Wu et al. |
| 2015/0133604 A1 | 5/2015 | Zong et al. |

FOREIGN PATENT DOCUMENTS

| | | |
|---|---|---|
| DE | 4417947 | 11/1995 |
| EP | 0282623 | 9/1990 |
| JP | 1056602 | 3/1989 |
| WO | 1999010413 | 3/1999 |
| WO | 2007128388 | 11/2007 |
| WO | 2014044616 | 3/2014 |
| WO | 2014146958 | 9/2014 |

*Primary Examiner* — Robert T Butcher
(74) *Attorney, Agent, or Firm* — Reid Willis

(57) ABSTRACT

The present invention relates to a coating composition which is a stable aqueous dispersion of polymer particles and a phenyl glycidyl ether adduct of maltodextrin. The composition of the present invention is useful for improving open time in coatings formulations.

11 Claims, No Drawings

COATING FORMULATION WITH AN OPEN TIME ADDITIVE

BACKGROUND OF THE INVENTION

The present invention relates to a coating formulation comprising an additive that provides improved open time; more particularly the additive comprises a phenyl glycidyl ether adduct of maltodextrin.

Government regulations and market movement continually drive toward zero volatile organic compounds (VOC) for coating formulations. Consequently, waterborne formulations that are free of volatile solvents and coalescents have become increasingly popular in the industry. Nevertheless, paint properties have been compromised due to this sea change; among them is open time, which is the period of time during which a freshly applied paint film can be reworked without leaving brush marks. In a solvent-borne system, open time is about 30 to 45 min; in a typical waterborne formulation, open time is on the order of 3 to 5 min. Accordingly, there is a need in the art to find an additive for waterborne formulations that increases open time over currently available additives without degrading other properties of the final coating, such as film adhesive and cohesive strength, hardness, block resistance, early blister resistance, scrub and wash resistance, stain resistance, and mar resistance.

SUMMARY OF THE INVENTION

The present invention addresses a need in the art by providing a coating composition comprising a stable aqueous dispersion of polymer particles and a phenyl glycidyl ether adduct of the compound of Formula I:

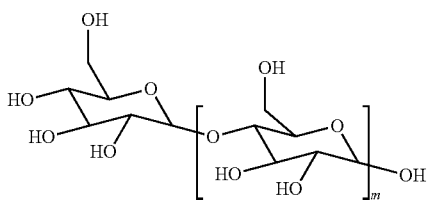

I where m is from 1 to 60.

The composition of the present invention is useful for providing improved open time in coatings formulations.

DETAILED DESCRIPTION OF THE INVENTION

The present invention addresses a need in the art by providing a coating composition comprising a stable aqueous dispersion of polymer particles and a phenyl glycidyl ether adduct of the compound of Formula I:

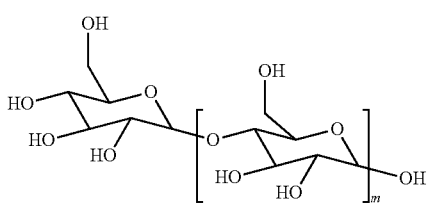

I where m is from 1 to 60.

Preferably, m is from 5, more preferably from 11, and most preferably from 15, to preferably 48, more preferably to 36, and most preferably to 24.

The term "stable aqueous dispersion of polymer particles" refers to a latex. The latex is not limited and can be any of a variety of latexes used in coatings formulations including acrylic, styrene-acrylic, vinyl-acrylic, and vinyl acetate based latexes.

As used herein, the term "phenyl glycidyl ether adduct of the compound of Formula I" refers to a compound or a mixture of compounds that are formed from the reaction of phenyl glycidyl ether and maltodextrin (the compound of Formula I). For example, a compound formed from the reaction of 2 moles of phenyl glycidyl ether and 1 mole of maltodextrin can be represented by the following Formula II:

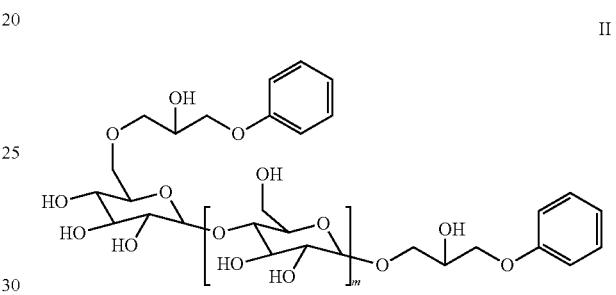

II

The actual point of attachment of the ring-opened glycidyl ether groups may be at any of the available OH sites of the maltodextrin. Furthermore, the ring-opened phenyl glycidyl ether groups are phenoxypropanol groups represented by either or both of the following isomers:

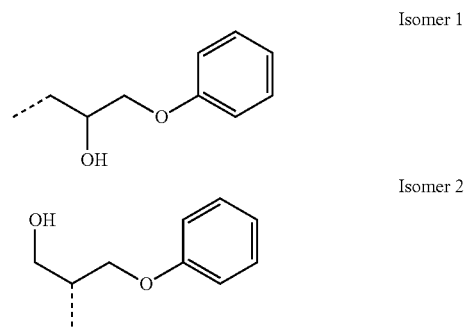

Isomer 1

Isomer 2 where the dotted lines represent the point of attachment of the phenoxypropanol group to an available oxygen atom of the maltodextrin molecule. The adduct can be characterized by number average molecule molecular weight ($M_n$) as measured by Matrix Assisted Laser Desorption Ionization Mass Spectrometry (MALDI-MS). By definition, it is assumed that the response factors for all the intensities observed in the mass spectrum are the same. The $M_n$ of the adduct is in the range of 500, more preferably from 1000, and from preferably from 1500 Daltons, to 10,000, preferably to 8000, more preferably to 5000, and most preferably to 3500 Daltons.

Preferably, the adduct is a multifunctional phenyl glycidyl ether adduct; that is to say, the maltodextrin is substituted with at least two phenoxypropanol groups, more preferably from two to four phenoxypropanol groups, more preferably two or three phenoxypropanol groups, and most preferably two phenoxypropanol groups. The degree of substitution was determined by MALDI-MS.

The phenyl glycidyl ether adduct of maltodextrin can be prepared, for example, by contacting phenyl glycidyl ether with maltodextrin in the presence of a catalyst. Base catalysts such as NaOH, KOH, $Na_2CO_3$, or $K_2CO_3$ are preferred but acid catalysts such as sulfuric acid, hydrochloride acid, p-toluene sulfonic acid, boron trifluoride, or iron chloride are also suitable. The reaction is advantageously carried out at a temperature in the range of from 25° C., preferably from 25° C., more preferably from 60° C., to 100° C., more preferably to 90° C.

The reaction is conveniently carried out in the presence of a polar solvent, preferably a mixture of solvents that includes water and one or more polar organic solvents such as ethanol, isopropanol, tetrahydrofuran, acetone, or methyl ethyl ketone. The volume/volume ratio of water to the organic solvent is typically in the range of from 20:80 to 80:20. High boiling polar organic solvents such as dimethylacetamide, dimethylformamide, and N-methyl-2-pyrrolidone are also suitable solvents, alone or in combination with water and/or another solvent.

In a preferred method for preparing the compound of Formula II, the compound of Formula I is contacted with phenyl glycidyl ether in the presence of NaOH, with water and isopropanol as a solvent, at a temperature in the range of from 60 to 85° C. The degree of substitution can be controlled by adjusting the mole-to-mole ratio of the maltodextrin and the phenyl glycidyl ether; typically, however, the final product is a mixture of a mono- and polysubstituted adducts, and may contain unreacted maltodextrin. The preferred mole:mole ratio of phenyl glycidyl ether to maltodextrin is from 1.2:1, more preferably from 1.5:1, more preferably from 1.8:1, and most preferably from 2.0:1, to preferably 4:1, more preferably to 3.5:1, more preferably to 3.2:1, and most preferably to 3.0:1.

The phenyl glycidyl ether adduct of maltodextrin is useful as an open time additive; that is to say, it increases the amount of time that a coating can be applied, spread, and touched up on a substrate. An increase in open time in water-borne coatings formulations often correlates with degradation of block resistance and stain resistance. Accordingly, in a preferred aspect of the composition of the present invention, the phenyl glycidyl ether adduct of maltodextrin is used in combination with other additives to tune open time, block resistance, and stain resistance to desirable levels. Examples of classes of other open time additives include tristrylphenol ethoxylates (commercially available as Soprophor BSU dispersant); tristyrylphenol ethoxylate sulfates; combinations of tristrylphenol ethoxylates and tristyrylphenol ethoxylate sulfates (commercially available as Rhodoline OTE-500 dispersant); copolymers of styrene and acrylic acid or methacrylic acid; copolymers of styrene, α-methylstyrene, and acrylic acid or methacrylic acid (commercially available as OROTAN™ CA-2500 Dispersant, a Trademark of The Dow Chemical Company or its Affiliates); copolymers of a) one or more acrylates selected from the group consisting of butyl acrylate, butyl methacrylate, and 2-ethylhexyl acrylate and b) one or more carboxylic acid monomers selected from the group consisting of acrylic acid and methacrylic acid; and polyether urethane ureas.

Polyether urethane ureas may be linear or branched and can be conveniently prepared by contacting together under reactive conditions a polyalkylene glycol, a polyisocyanate, and an alkylene diamine. The reaction is advantageously carried out in the presence of a catalyst such as a tin or a bismuth catalyst.

The polyalkylene glycol may be a polyethylene glycol, a polypropylene glycol, or a polybutylene glycol. Preferably, the weight average molecular weight of the polyalkylene glycol ($M_w$, as measured by size exclusion chromatography using polyethylene glycol standards) is in the range of from 2000, more preferably from 4000, and most preferably from 6000 Daltons, to 15,000, more preferably to 12,000, and most preferably to 10,000 Daltons. A preferred polyalkylene glycol is a polyethylene glycol, a commercially available example of which is polyethylene glycol is CARBOWAX™ 8000 Polyethylene Glycol (a Trademark of The Dow Chemical Company or its Affiliates). Preferred polyisocyanates are di- and triisocyanates, examples of which include 1,4-tetramethylene diisocyanate, 1,6-hexamethylene diisocyanate (HDI), 1,3,5-tris(6-isocyanatohexyl)1,3,5-triazine-2,4,6(1H,3H,5H)-trione (HDI trimer), 2,2,4-trimethyl-1,6-diisocyanatohexane, 1,10-decamethylene diisocyanate, 4,4'-methylenebis(isocyanatocyclohexane) ($H_{12}MDI$), 2,4'-methylenebis(isocyanatocyclohexane), 1,4-cyclohexylene diisocyanate, 1-isocyanato-3-isocyanatomethyl-3,5,5-trimethylcyclohexane (IPDI), and IPDI trimer. Examples of preferred alkylene diamines are $C_2$-$C_8$-alkylene diamines, more preferably $C_2$-$C_6$-alkylene diamines.

The total concentration of the open time additive or additive is in the range of from preferably 0.1, more preferably from 0.2, and most preferably from 0.5 weight percent, to preferably 5, more preferably to 3 and most preferably to 2 weight percent, based on the weight of the composition.

The composition of the present invention is advantageously prepared by combining the latex and the one or more open time additives described hereinabove with additional water and one or more components selected from the group consisting of a dispersant, a defoamer, a surfactant, a biocide, a thickener, a neutralizing base, a water soluble co-solvent, a coalescent, a pigment, a colorant, and an extender. In a preferred aspect, the composition is a paint composition comprising the one or more open time additives, the latex, water, a dispersant, a defoamer, a surfactant, a biocide, a thickener, a water soluble co-solvent, a coalescent, and $TiO_2$.

It has been discovered that open time can be improved using the phenyl glycidyl ether adduct of maltodextrin, and that open time, block resistance, and stain resistance can be tuned to desirable levels by using this adduct in combination with one or more open time additives.

Intermediate Example 1—Preparation of Phenyl Glycidyl Ether Adduct of Maltodextrin A commercially available maltodextrin (obtained from Sigma-Aldrich SKU419672) having a Dextrose Equivalent of from 4.0 to 7.0 (15 g, ~3500 g/mol, m~22, 4.3 mmol) was added to a 3-neck 500-mL round bottom flask equipped with a condenser, an overhead stirrer and a nitrogen purge. Deionized water (81.25 g) was added to the flask and the maltodextrin was allowed to dissolve for 15 min at 190 rpm. Isopropanol (20.31 g) was then added and the mixture was purged with nitrogen for 1 h. Next, sodium hydroxide (50% solution, 2.67 g. 33 mmol) was added dropwise to the reactor over 2 min and purging with nitrogen was continued for another 30 min. Phenyl glycidyl ether (1.26 g, 8.4 mmol) was then added and the mixture was purged for an additional 10 min before heating the reaction mixture to 78° C. The reaction temperature was reached after 10 min, at which time the mixture had dissolved fully and turned light brown. After 1 h at 78° C., the reaction mixture was cooled to room temperature whereupon acetic acid (2 g, 33 mmol) was added. The reaction products were isolated by removing solvent in vacuo, then redissolving the resultant solid in water (150 mL), then freeze drying. A brown solid (15.1 g) was obtained. Structure was confirmed by $^1$H NMR ($\delta$ 7.41-6.78, 10 H, $\delta$ 6.36-3.37, 229H) and MALDI-TOF mass spectrometry (each set of peaks separated by 162 Da, and as an example for one set of peaks: m/z=1625.6, 1637.6, 1649.6, 1661.6 Da, where z is the charge per molecule). The peak at 1637.6 is consistent with the presence of a disubstituted maltodextrin. MALDI-TOF Mass spectrometry showed that ~50% of the maltodextrin was disubstituted. Non-substituted, mono-substituted, and tri-substituted maltodextrin was also detected in the product mixture.

Intermediate Example 2—Preparation of Polyether Urethane Urea

A solution of polyethylene glycol (8200 g/mol, 82.2 g) in toluene (202 g) was dried by azeotropic distillation. After the solution was cooled to 90° C., ethylene diamine (0.075 g) was added, and the solution was stirred for 5 min. Desmodur N3600 HDI trimer (1.68 g) and ethoxylated glycerol (1236 g/mol, 2.07 g) were added in succession, and the reaction mixture was stirred for another 5 min. Bismuth octoate (0.21 g) was then added, and the reaction mixture was stirred for 1 h. The reaction mixture was cooled to room temperature, and the solvent was removed in vacuo. The polymer was isolated as an off-white solid. Mn=13,000;
MALDI-TOF Measurement The MALDI mass spectrum was acquired on a Bruker Daltonics ultraflex MALDI-TOF mass spectrometer equipped with a nitrogen laser (X, =337 nm). In the MALDI experiment, 20 mg of dihydroxybenzoic acid was dissolved in 1 mL of THF. Example 1 was dissolved in $H_2O$/isopropanol (4:1 v/v) at a concentration of 5 mg/mL. The solution was premixed with the matrix solution at a ratio of 1:10 v/v. NaI was added into the sample/matrix mixture and 0.3 μL of the mixture was then placed on the sample plate and was air dried for MALDI-MS analysis.
Preparation of Paint Formulation with Glycidyl Ether Adduct of Maltodextrin The glycidyl ether adduct of maltodextrin of Example 1 was evaluated for open time and stain resistance in the following screening formulation. Orotan CA-2500 was 25% active; Rhodoline OTE 500 and Soprophor BSU were taken as 100%; Examples 1 and 2 were 40% active.

TABLE 1

Paint Formulation with Open Time Additive

| Material Name | Pounds | Gallons |
|---|---|---|
| LetDown | | |
| RHOPLEX ™ HG-706 Binder | 584.1 | 66.0 |
| BYK-024 Defoamer | 1.0 | 0.1 |
| Premix | | |
| Propylene Glycol | 4.3 | 0.5 |
| TRITON ™ X-100 Surfactant | 4.4 | 0.5 |
| Water | 16.7 | 2.0 |
| KATHON ™ LX 1.5% Biocide | 1.5 | 0.2 |
| TAMOL ™ 2002 Dispersant | 2.0 | 0.2 |
| Ammonia (28%) | 1.0 | 0.1 |

TABLE 1-continued

Paint Formulation with Open Time Additive

| Material Name | Pounds | Gallons |
|---|---|---|
| Premix Sub-total | 29.9 | 3.5 |
| Add premix to letdown | | |
| Ti-Pure R-746 $TiO_2$ | 285.0 | 14.7 |
| Water | 20.0 | 2.4 |
| TEXANOL Coalescent | 7.9 | 1.0 |
| ACRYSOL ™ RM-2020E Rheology Modifier | 20.0 | 2.3 |
| ACRYSOL ™ RM-725 Rheology Modifier | 3.0 | 0.4 |
| BYK-024 Defoamer | 2.0 | 0.2 |
| Open Time Additive (active) | 10.3 | 1.2 |
| Water | 68.7 | 8.3 |
| Totals | 1032 | 100 |

RHOPLEX, TRITON, KATHON, TAMOL, and ACRYSOL are all Trademarks of The Dow Chemical Company or its Affiliates.

The formulations were drawn down on panels as described below and tested for open time, dirt pickup resistance (DPUR), block resistance, and stain resistance.

Dirt Pickup Resistance (DPUR) A doctor blade with a 7-mil gap was used to make drawdowns on chromated aluminum panels. The coatings were allowed to dry overnight in controlled temperature 25° C. and humidity 50% relative humidity (CTR) conditions and then placed in a QUV A Light Only cabinet for 2 d. Five measurements of the Y reflectance were taken by an Ocean Optics spectrometer. AATCC standardized dirt was evenly sprinkled on the coating and allowed to stand on the panel for 30 min at CTR conditions. The substrate was then tilted vertically to release the dirt. Y reflectance was then measured in the same manner as before.
Block Resistance Drawdowns on white Leneta W8-L charts were made using a doctor blade with a 6-mil gap. Coatings were precision cut to the desired sample size using an Epilog Zing Laser. Weights were placed on the samples to apply a constant force for 30 min under CTR conditions at 50° C. Three measurements were made for the samples using a TA-XT Plus Texture Analyzer. Results are reported for a 1-d cure.
Open Time and Stain Measurements Open time was measured in accordance with ASTM-D7488. Stain resistance studies were carried out by first applying the paint formulation to a white vinyl substrate with a 7-mil (0.18-mm) doctor blade. The film was allowed to stand for 7 days and the substrates were scanned using a calibrated flatbed scanner to obtain a baseline measurement. Stains were then applied to the dried film and allowed to set for 2 h before being subjected to the removal test: Leneta SC-1 non-abrasive media was combined with water (3:2 v/v) to form a solution. A thin film of the solution was applied to the stained coating; a non-abrasive sponge was dipped into the solution for 10 s, then contacted with the stained coating at a pressure of about 5 kPa and oscillated at 60 cycles/min (back and forth=1 cycle) for 100 s. The scrubbed substrates were rinsed with water and the stained substrates were imaged with the scanner to measure the root mean square difference in Lab coordinates between the baseline and the scrubbed stains ($\Delta E_{76}$).

In the following Table 2, OTE-500 refers to Rhodoline OTE-500 Additive, which is an open time additive widely used in the industry.

Table 2 illustrates the open time (OT) and stain results for a number of household stains. BSU refers to Soprophor BSU additive, CA-2500 refers to Orotan CA-2500 additive, OTE-500 refers to Rhodoline OTE-500 additive. The total amount of active open time additive is 10.3 lb/100 gal; the percentages of mixtures represent weight percentages of the active materials used.

TABLE 2

Open Time and Stain Results for a Variety of Household Stains

| Open time additive | open time (min) | block, 1 d 25° C., $g_f$ | DPUR, ΔY | grape ΔY | ketch-up ΔY | mus-tard ΔY | lip-stick ΔY |
|---|---|---|---|---|---|---|---|
| Control | 5 | 37.8 | 5.1 | 8.9 | 7.6 | 15.7 | 5.5 |
| Int. Ex. 1 | 6.7 | 13.8 | 1.3 | 6.5 | 5.5 | 11.1 | 4.8 |
| BSU | 10.3 | 41.5 | 7.6 | 11.5 | 9.6 | 17.4 | 6.1 |
| Int. Ex. 2 | 8.0 | 0.0 | 6.4 | 10.0 | 11.2 | 16.5 | 4.1 |
| CA-2500 | 7.8 | 22.2 | 3.8 | 12.0 | 8.2 | 15.2 | 6.9 |
| OTE-500 | 10.0 | 38.3 | 9.9 | 11.1 | 9.5 | 14.2 | 7.2 |
| Int. Ex 1 (50%) + BSU (50%) | 8.3 | 27.6 | 4.5 | 9.0 | 7.6 | 14.3 | 5.5 |
| Int. Ex. 1 (50%) + Int. Ex. 2 (50%) | 7.1 | 5.4 | 3.9 | 8.2 | 8.4 | 13.8 | 4.5 |
| Int. Ex 1 (50%) + CA-2500 (50%) | 7.0 | 18.0 | 2.6 | 9.2 | 6.9 | 13.1 | 5.9 |
| Int. Ex. 1 (50%) + OTE-500 (50%) | 8.1 | 26.1 | 5.6 | 8.8 | 7.5 | 12.6 | 6.0 |
| Int. Ex 1 (70%) + OTE-500 30%) | 7.3 | 21.1 | 3.9 | 7.8 | 6.7 | 12.0 | 5.5 |
| Int. Ex 1 (30%) + BSU (70%) | 9.1 | 33.1 | 5.7 | 10 | 8.4 | 15.5 | 5.7 |
| Int. Ex 1 (70%) + BSU (30%) | 7.4 | 22 | 3.2 | 8 | 6.8 | 13 | 5.2 |
| Int Ex. 1 (30%) + Int. Ex. 2 (70%) | 7.4 | 2 | 4.9 | 8.9 | 9.5 | 14.9 | 4.3 |
| Int. Ex 1 (70%) + Int. Ex. (30%) | 6.7 | 8.7 | 2.9 | 7.5 | 7.2 | 12.7 | 4.6 |

The compound of the present invention showed improved open time, stain resistance, and block resistance compared to the control, as well as significantly improved stain and block resistance as compared with conventional open time additives BSU, CA-2500, and OTE-500 (except for mustard). The results also demonstrate that stain, block, and open time can be adjusted by combining the phenyl glycidyl ether adduct of maltodextrin with other open time additives, thereby giving a formulator flexibility in tuning the balance of these properties.

What is claimed is:

1. A coating composition comprising a stable aqueous dispersion of polymer particles and an additive which is a phenyl glycidyl ether adduct of the compound of Formula I:

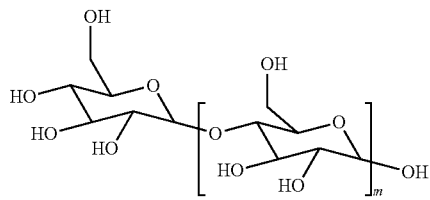

where m is from 1 to 60.

2. The composition of claim 1 wherein m is from 5 to 48 and the phenyl glycidyl ether adduct of the compound of Formula I is a multifunctional adduct.

3. The composition of claim 2 wherein m is from 11 to 36 and the phenyl glycidyl ether adduct of the compound of Formula I is a di- or trifunctional adduct.

4. The composition of claim 1 wherein the phenyl glycidyl ether adduct of the compound of Formula I has a number average molecular weight of from 500 to 10,000 Daltons and is substituted with at least two phenoxypropanol groups.

5. The composition of claim 4 wherein the phenyl glycidyl ether adduct of the compound of Formula I has a number average molecular weight of from 1500 to 5000 Daltons and is substituted with two or three phenoxypropanol groups.

6. The composition of claim 5 wherein the phenyl glycidyl ether adduct of the compound of Formula I has a number average molecular weight of from 1500 to 3500 Daltons and is substituted with two phenoxypropanol groups.

7. The composition of claim 1 which further comprises one or more additional additives selected from the group consisting of tristrylphenol ethoxylates; tristyrylphenol ethoxylate sulfates; copolymers of styrene and acrylic acid; copolymers of styrene and methacrylic acid; copolymers of styrene, α-methylstyrene, and acrylic acid; and copolymers of styrene, α-methylstyrene and methacrylic acid.

8. The composition of claim 7 wherein the one or more additional additives are selected from the group consisting of tristrylphenol ethoxylates; tristyrylphenol ethoxylate sulfates; copolymers of styrene, α-methylstyrene, and acrylic acid; and copolymers of styrene, α-methylstyrene and methacrylic acid.

9. The composition of any of claim 1 which further includes additional water, a dispersant, a defoamer, a surfactant, a biocide, a thickener, a water soluble co-solvent, a coalescent, and $TiO_2$.

10. The composition of claim 1 which further comprises an additional additive which is a copolymer of a) butyl acrylate, butyl methacrylate, or 2-ethylhexyl acrylate, or a combination thereof; and b) acrylic acid or methacrylic acid or a combination thereof.

11. The composition of claim 1 which further comprises an additional additive which is a polyether urethane urea.

* * * * *